(12) United States Patent
Vajravel et al.

(10) Patent No.: US 12,292,948 B2
(45) Date of Patent: May 6, 2025

(54) VERIFYING TRUST OF A SECURE WORKSPACE THAT IS FORMED OF MULTIPLE LAYERS WITH DISTRIBUTED OWNERSHIP

(71) Applicant: Dell Products L.P., Round Rock, TX (US)

(72) Inventors: Gokul Thiruchengode Vajravel, Bangalore (IN); Amy Christine Nelson, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 286 days.

(21) Appl. No.: 18/164,715

(22) Filed: Feb. 6, 2023

(65) Prior Publication Data

US 2024/0265070 A1 Aug. 8, 2024

(51) Int. Cl.
*G06F 21/10* (2013.01)
*H04L 9/32* (2006.01)

(52) U.S. Cl.
CPC ........ *G06F 21/1085* (2023.08); *H04L 9/3263* (2013.01)

(58) Field of Classification Search
None
See application file for complete search history.

(56) References Cited

U.S. PATENT DOCUMENTS

| | | | |
|---|---|---|---|
| 8,429,540 B1 * | 4/2013 | Yankovich | G06F 9/4451 709/204 |
| 2011/0061046 A1 * | 3/2011 | Phillips | G06F 9/45533 717/176 |
| 2021/0136082 A1 * | 5/2021 | Andrews | H04L 63/105 |
| 2022/0179959 A1 * | 6/2022 | Silveira | G06F 21/57 |
| 2023/0306133 A1 * | 9/2023 | Bakshi | G06F 21/645 |

\* cited by examiner

*Primary Examiner* — Philip J Chea
*Assistant Examiner* — James Ross Hollister
(74) *Attorney, Agent, or Firm* — Kirton McConkie; Brian Tucker

(57) ABSTRACT

Trust of a secure workspace that has multiple layers with distributed ownership can be verified. A management service can maintain a repository of layers for secure workspaces and a certificate vault storing certificates of the owners of the layers. The management service can also maintain workspace metadata defining secure workspaces that pertain to a particular user and the layers that form the secure workspaces. When a secure workspace is to be deployed on a user computing device, the management service can send the layers that form the secure workspace and the workspace metadata for the secure workspace to a host agent on the user computing device. The host agent can then leverage the certificates of the owners of the layers to verify the trust of each layer and, if trust is verified for all layers that form the secure workspace, can deploy the secure workspace on the user computing device.

20 Claims, 8 Drawing Sheets

VERIFYING TRUST OF A SECURE WORKSPACE THAT IS FORMED OF MULTIPLE LAYERS WITH DISTRIBUTED OWNERSHIP

CROSS-REFERENCE TO RELATED APPLICATIONS

N/A

BACKGROUND

In the context of this application, a secure workspace refers to an isolated environment in which one or more applications may be hosted on a computing device. A secure workspace, which may also be referred to as a sandbox, is oftentimes implemented using a virtual machine or software-based container. An application hosted in a secure workspace will be isolated from resources in the external environment and from other applications or services hosted external to the secure workspace.

In some cases, a secure workspace may be bundled and managed as a single monolithic image (e.g., as a vhdx file). However, many customers prefer defining a secure workspace as a collection of layers with distributed ownership. For example, a secure workspace could include a base operating system layer that is maintained and owned by the customer, a operating system patch layer that is maintained and owned by the customer, a library layer that is maintained and owned by an independent software vendor, a first application layer that is maintained and owned by another independent software vendor, a first application data layer maintained and owned by the customer, etc.

With this layered technique, the customer can maintain its own layers independent of the layers maintained by the independent software vendors or other third-party provider. However, when a secure workspace includes multiple layers, there is no option for performing trust verification on the secure workspace.

BRIEF SUMMARY

The present invention extends to systems, methods and computer program products for verifying trust of a secure workspace that has multiple layers with distributed ownership. A management service can maintain a repository of layers for secure workspaces and a certificate vault storing certificates of the owners of the layers. The management service can also maintain workspace metadata defining secure workspaces that pertain to a particular user and the layers that form the secure workspaces. When a secure workspace is to be deployed on a user computing device, the management service can send the layers that form the secure workspace and the workspace metadata for the secure workspace to a host agent on the user computing device. The host agent can then leverage the certificates of the owners of the layers to verify the trust of each layer and, if trust is verified for all layers that form the secure workspace, can deploy the secure workspace on the user computing device.

In some embodiments, the present invention may be implemented by a host agent on a user computing device as a method for verifying trust of a secure workspace that is formed of multiple layers with distributed ownership. The host agent can access workspace metadata for a first secure workspace that is to be deployed on the user computing device. The workspace metadata for the first secure workspace can identify multiple layers that form the first secure workspace. The host agent can use a first certificate pertaining to a first owner to verify trust of a first set of the multiple layers. The host agent can use a second certificate pertaining to a second owner to verify trust of a second set of the multiple layers that is different from the first set. After verifying the trust of the first set of the multiple layers and the trust of the second set of the multiple layers, the host agent can deploy the first secure workspace on the user computing device.

In some embodiments, the present invention may be implemented as computer storage media storing computer executable instructions which when executed on a user computing device implement a host agent that is configured to perform a method for verifying trust of a secure workspace that is formed of multiple layers with distributed ownership. The host agent may access workspace metadata for a first secure workspace that is to be deployed on the user computing device. The workspace metadata for the first secure workspace can identify multiple layers that form the first secure workspace, and the multiple layers can have distributed ownership. For each of the multiple layers, the host agent verifies a trust of the layer using a certificate of an owner of the layer. After verifying the trust of the multiple layers, the host agent can deploy the first secure workspace on the user computing device.

In some embodiments, the present invention can be implemented as a system that includes a management server on which a management service is hosted and a plurality of user computing devices that are managed from the management server. Each of the plurality of user computing devices can have a host agent that is configured to perform a method for verifying trust of a secure workspace that is formed of multiple layers with distributed ownership. The host agent can receive the multiple layers from the management service. The host agent can use a first certificate pertaining to a first owner to verify trust of a first set of the multiple layers. The host agent can use a second certificate pertaining to a second owner to verify trust of a second set of the multiple layers that is different from the first set. Upon verifying the trust of the first set of the multiple layers and the trust of the second set of the multiple layers, the host agent can deploy the secure workspace on the user computing device. Upon failing to verify the trust of any of the first set of the multiple layers or the trust of any of the second set of the multiple layers, the host agent can prevent the secure workspace from being deployed on the user computing device.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification, the term "layer" should be construed as an executable image that makes up part of a secure workspace. For example, a layer could be an image containing a base operating system, an image containing an application, an image containing data, an image containing libraries used by one or more applications, etc. Ownership of a layer should be construed as having control over the contents of the layer. The term customer can represent any individual or entity that uses a management server to manage his, her, or its user computing devices. The management server would typically be operated by an entity other than the customers. For example, Dell could operate the management server for many different customers.

Figure 1:
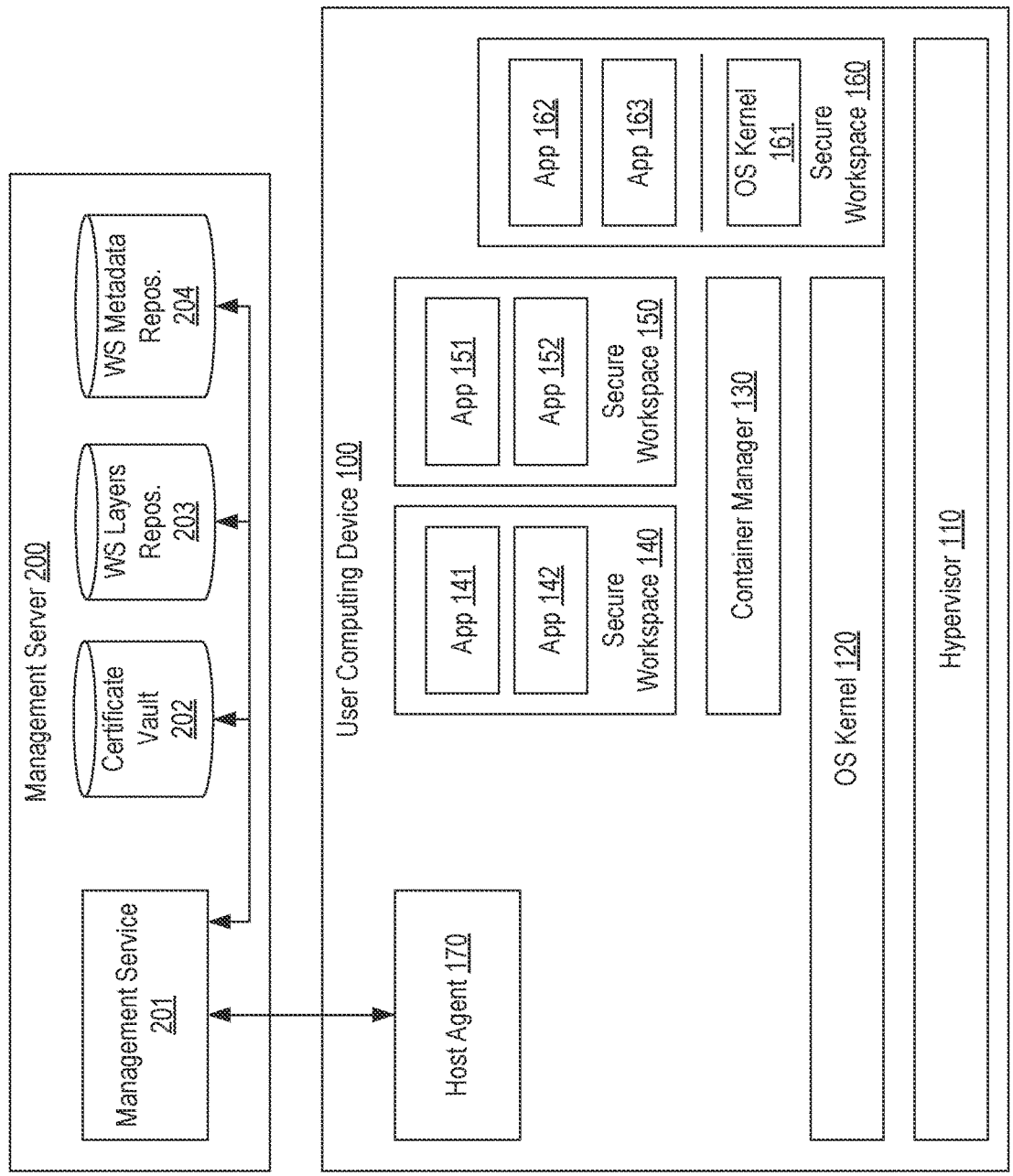
FIG. 1 provides an example of a computing environment in which embodiments of the present invention may be implemented.

FIG. 1 provides an example of a computing environment in which one or more embodiments of the present invention may be implemented. This computing environment includes a user computing device 100 and a management server 200 which is used to manage user computing device 100. Although only a single user computing device 100 is shown, management server 200 may typically be used to manage a large number of user computing devices, any or all of which could be configured in the same manner as user computing device 100 to thereby allow the trust of secure workspaces deployed on the user computing devices to be verified in accordance with embodiments of the present invention.

User computing device 100 is shown as having a hypervisor (e.g., Hyper-V) which can allow secure workspaces in the form of virtual machines to be deployed on user computing device 100. User computing device 100 can also include an operating system (OS) which has an OS kernel 120 on which a container manager 130 may be run. Container manager 130 could allow secure workspaces 140 and 150 to be deployed on user computing device 100 in the form of containers (e.g., Docker containers).

Secure workspace 140 is shown as hosting an app 141 and an app 142. Although not shown, one or more libraries could be hosted in secure workspace 140 to support app 141 and/or app 142. Similarly, secure workspace 150 hosts app 151 and app 152 and may also include one or more corresponding libraries. Secure workspace 160 includes an OS kernel 161 on which an app 162 and an app 163 are run. Again, secure workspace 160 could include one or more libraries for supporting app 162 and/or app 163.

User computing device 100 may also include a host agent 170 that is configured to communicate with a management service 201 on management server 200. Management server 200 can maintain or provide access to a certificate vault 202 in which certificates (and possibly corresponding keys) are stored for use in verifying trust in accordance with the techniques of the present invention. Management server 200 can also maintain or provide access to a workspace layers repository 203 in which the various layers that make up a secure workspace can be stored. Management server 200 may further maintain or provide access to a workspace metadata repository 204 in which metadata for each secure workspace can be stored. Workspace metadata for a particular workspace can define which layers form the secure workspace.

Figure 2:
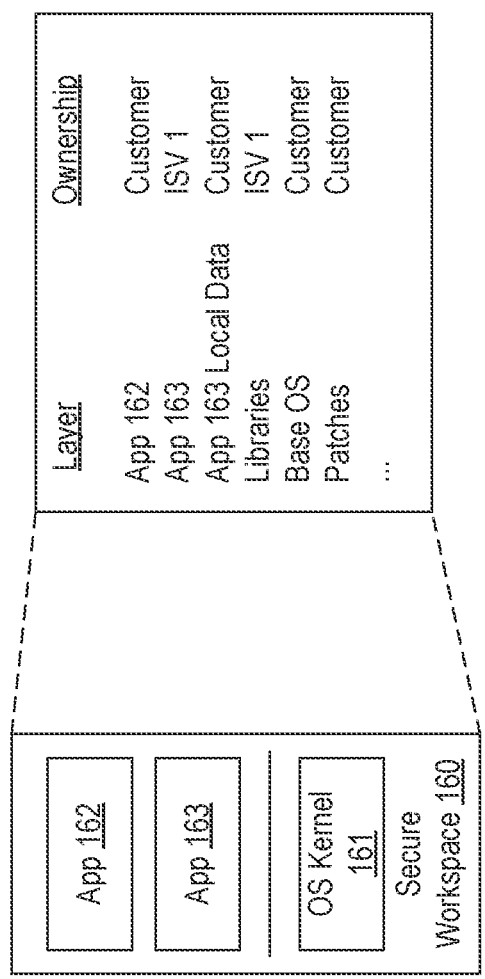
FIG. 2 provides an example of how a secure workspace can be formed of multiple layers with distributed ownership.

FIG. 2 provides an example of how a secure workspace, which in this case is secure workspace 160, can include multiple layers having distributed ownership. As shown, secure workspace 160 is formed of a layer for app 162, a layer for app 163, a layer for app 163's local data, a layer for libraries, a layer for the base OS, and a layer for patches, among possibly other layers. For this example, it is assumed that the customer owns the layers for app 162, app 163's local data, the base OS, and the patches, and an independent software vendor (ISV 1) owns the layers for app 163 and the libraries. In some embodiments, each of these layers could be maintained in workspace layers repository 203 and provided to host agent 170 which could then create and/or update secure workspace 160 from these layers.

Figure 3:
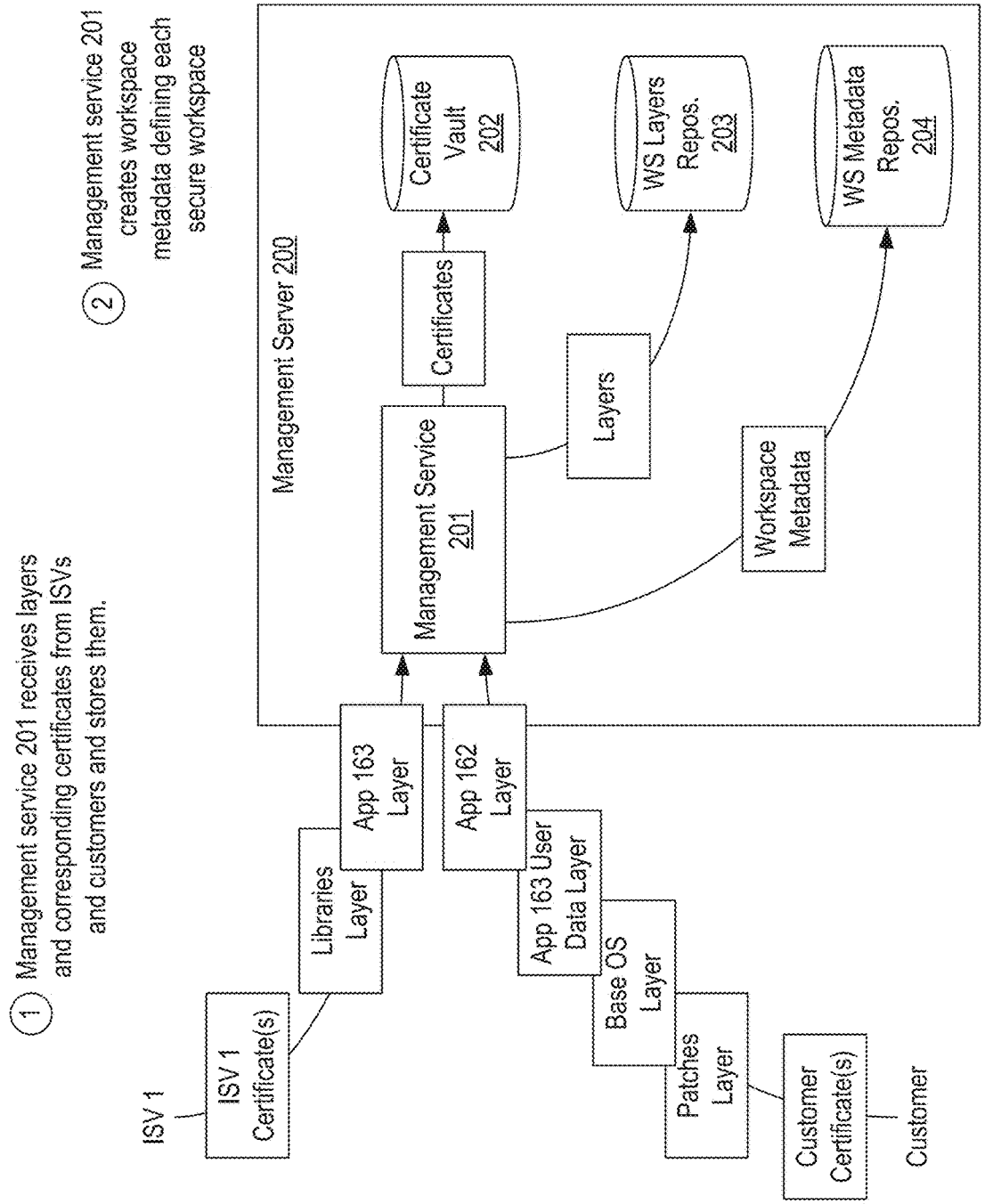
FIG. 3 provides an example of how a management service gathers layers to be used in forming secure workspaces and certificates of the owners of the layers and creates workspace metadata defining the layers in accordance with one or more embodiments of the present invention.

FIG. 3 provides an example of how management service 201 can gather layers that will be used to form secure workspaces on user computing devices and certificates of the owners of the layers. This example is based on secure workspace 160 as shown in FIG. 2 but could represent functionality for gathering layers and certificates from many different customers, ISVs, or other sources for secure workspaces to be deployed to many user computing devices.

In step 1, management service 201 is shown as receiving the layers for app 162, app 163's local data, the base OS, and the patches from the customer and the layers for app 163 and the libraries from ISV 1 and storing them in workspace layers repository 203. In step 1, management service 201 is also shown as receiving one or more certificates from the customer and one or more certificates from ISV 1 (possibly along with their respective public keys) and storing them in certificate vault 202. Each of the layers may be signed using the respective owner's private key, and therefore, the corresponding certificate can be used to verify that the public key necessary for verifying the signature can be trusted as having originated with the respective owner. Notably, an owner of a layer could provide a new or updated layer at any time.

In step 2, management service 201 creates workspace metadata defining each secure workspace and stores the workspace metadata in workspace metadata repository 204. For example, management service 201 could create workspace metadata for secure workspace 160 which can identify each layer in secure workspace 160 and one or more users (or user computing devices) to which secure workspace 160 pertains. In some embodiments, management service 201 may also sign the workspace metadata, and in such embodiments, management service 201 could store its own certificate(s) in certificate vault 202.

FIGS. 4A-4E provide an example of how the trust of a secure workspace that is formed of multiple layers with distributed ownership can be verified prior to deploying the secure workspace on a user computing device. The example in FIGS. 4A-4E will be based on FIGS. 1-3 and will describe how the trust of secure workspace 160 can be verified prior to secure workspace 160 being deployed on user computing device 100. However, these steps could be performed whenever a secure workspace is to be deployed on any user computing device.

Figure 4A:
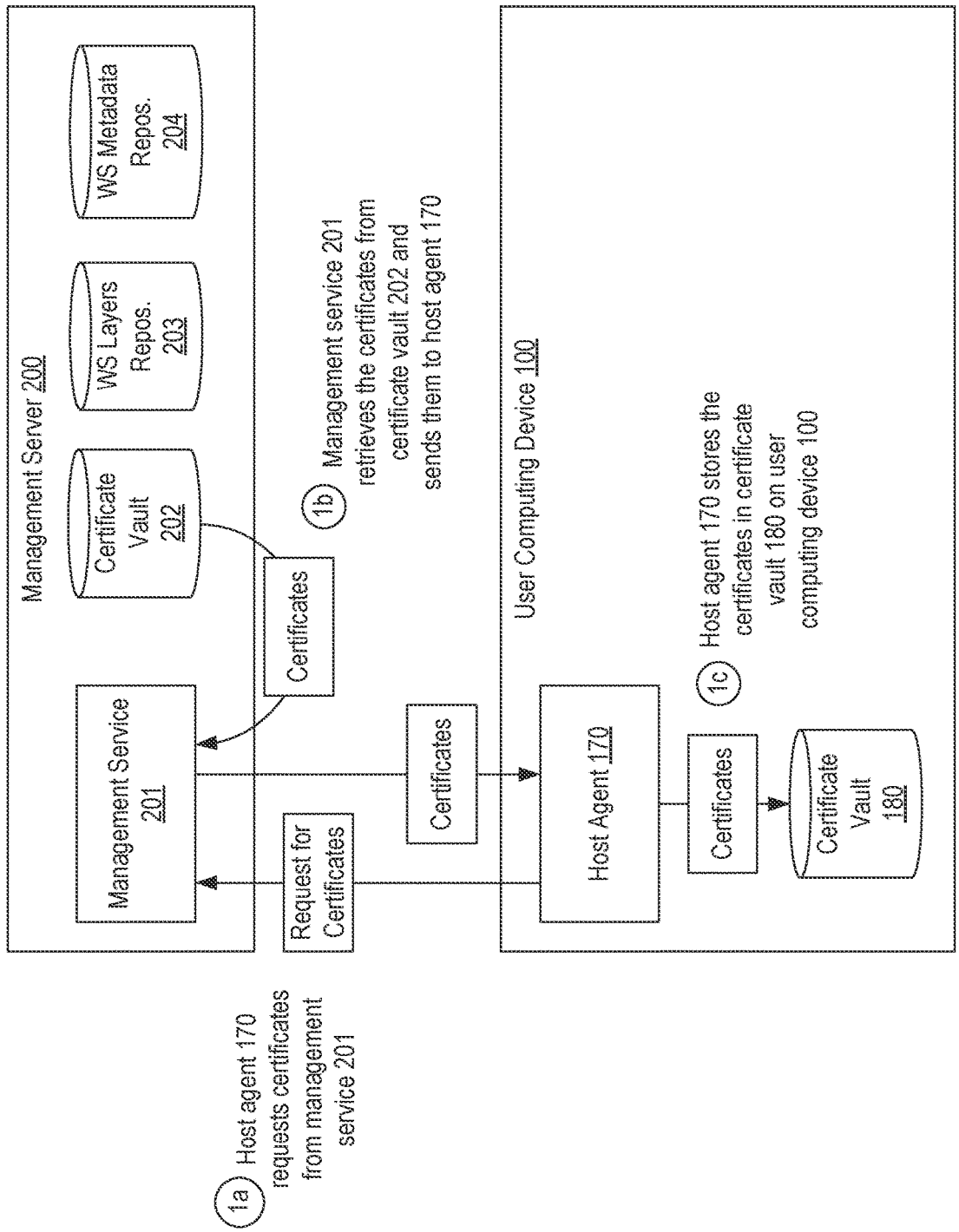
FIGS. 4A-4E provides an example of how a host agent on a user computing device can verify the trust of a secure workspace formed of multiple layers having distributed ownership in accordance with one or more embodiments of the present invention.

Turning to FIG. 4A, it is assumed that user computing device 100 is starting up and that host agent 170 has been loaded. It is also assumed that host agent 170 has not yet caused any secure workspaces to be deployed on user computing device 100. Hypervisor 110 and OS kernel 120 are not shown to simplify the figures. In step 1a, which may be performed as part of its startup, host agent 170 can establish a session with management server 201 to request certificates (among possibly other functionality). FIG. 4A shows that user computing device 100 includes a certificate vault 180 (e.g., the Windows certificate manager) which may already store at least some of the certificates. In such cases, step 1a could be viewed as a request to synchronize certificate vault 180 to certificate vault 202. In step 1b, management service 201 can retrieve the certificates from certificate vault 202 and provide them to host agent 170. In step 1c, host agent 170 can store the certificates in certificate vault 180. For purposes of this example, these certificates can include the customer's certificate, ISV 1's certificate, and a certificate of management server 200. Accordingly, after step 1c, certificate vault 180 should store each certificate that host agent 170 may need to verify a layer of a secure workspace and workspace metadata for the secure workspace.

Figure 4B:
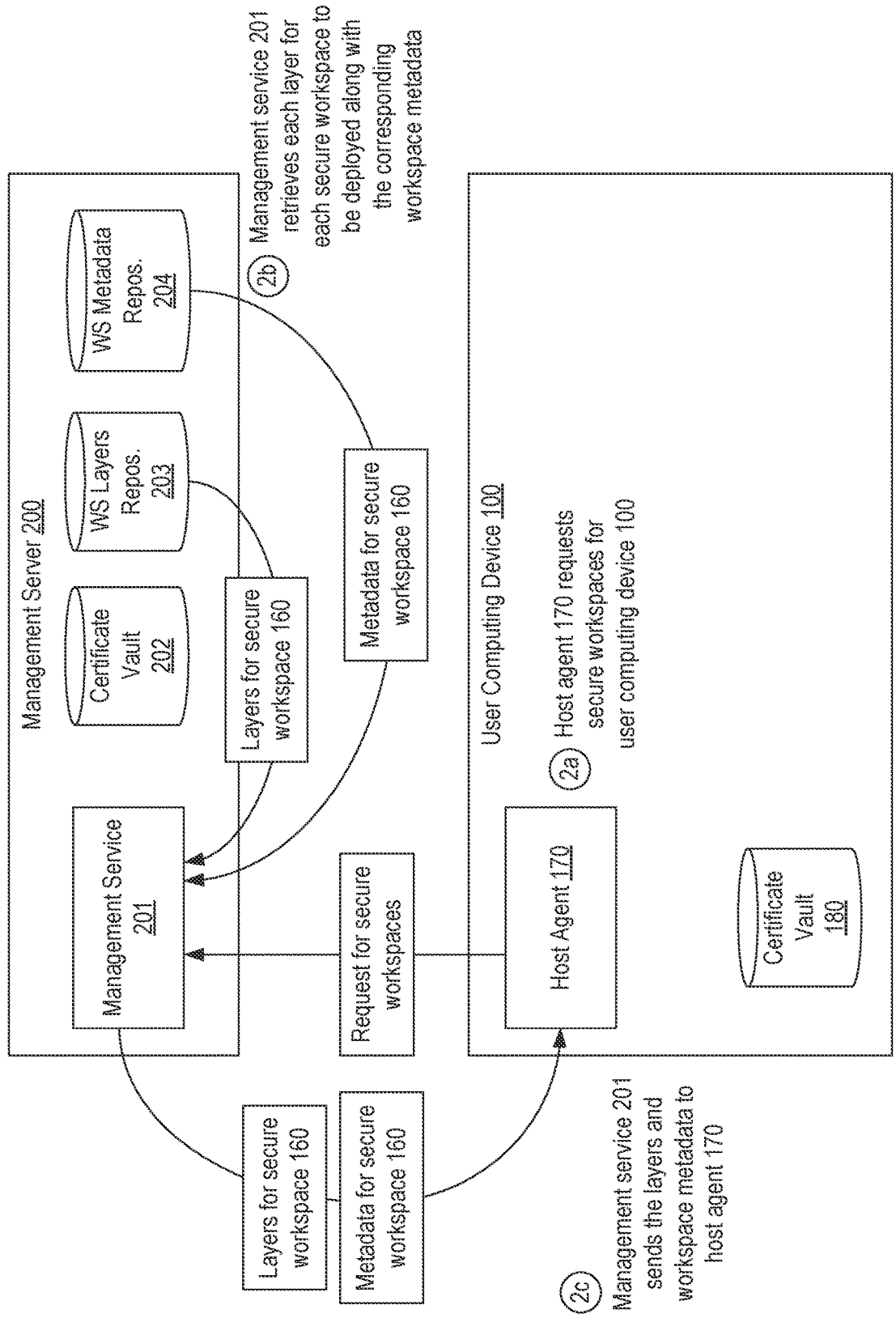

Turning to FIG. 4B, in step 2a, which may or may not be a separate step from step 1a, host agent 170 can send a request to management service 201 for any secure workspaces that are to be deployed on user computing device 100. In some embodiments, step 2a could entail providing an identifier of a user that is logged in to user computing device 100, providing an identifier of user computing device 100, or providing some other information by which management service 201 could identify secure workspaces that are to be deployed on user computing device 100. For purposes of this example, it is assumed that host agent 170 provides a user identifier of the user that has logged in to user computing device 100.

In step 2b, management service 201 can access workspace metadata repository 204 to retrieve relevant workspace metadata which in this example could be any workspace metadata that is associated with the user identifier that host agent 170 specified. As shown, this workspace metadata includes metadata for secure workspace 160. Likewise, management service 201 can access workspace layers repository 203 to retrieve the layers of each secure workspace that is to be deployed on user computing device 100. For example, using the metadata for secure workspace 160, management service 201 could identify each layer that forms secure workspace 160 and then retrieve the layers from workspace layers repository 203. In step 2c, management service 201 can send to host agent 170 the workspace metadata and the layers of each secure workspace to be deployed on user computing device 100. Although not shown, these steps could result in the metadata for secure workspaces 140 and 150 and each layer that forms secure workspaces 140 and 150 being sent to host agent 170.

Figure 4C:
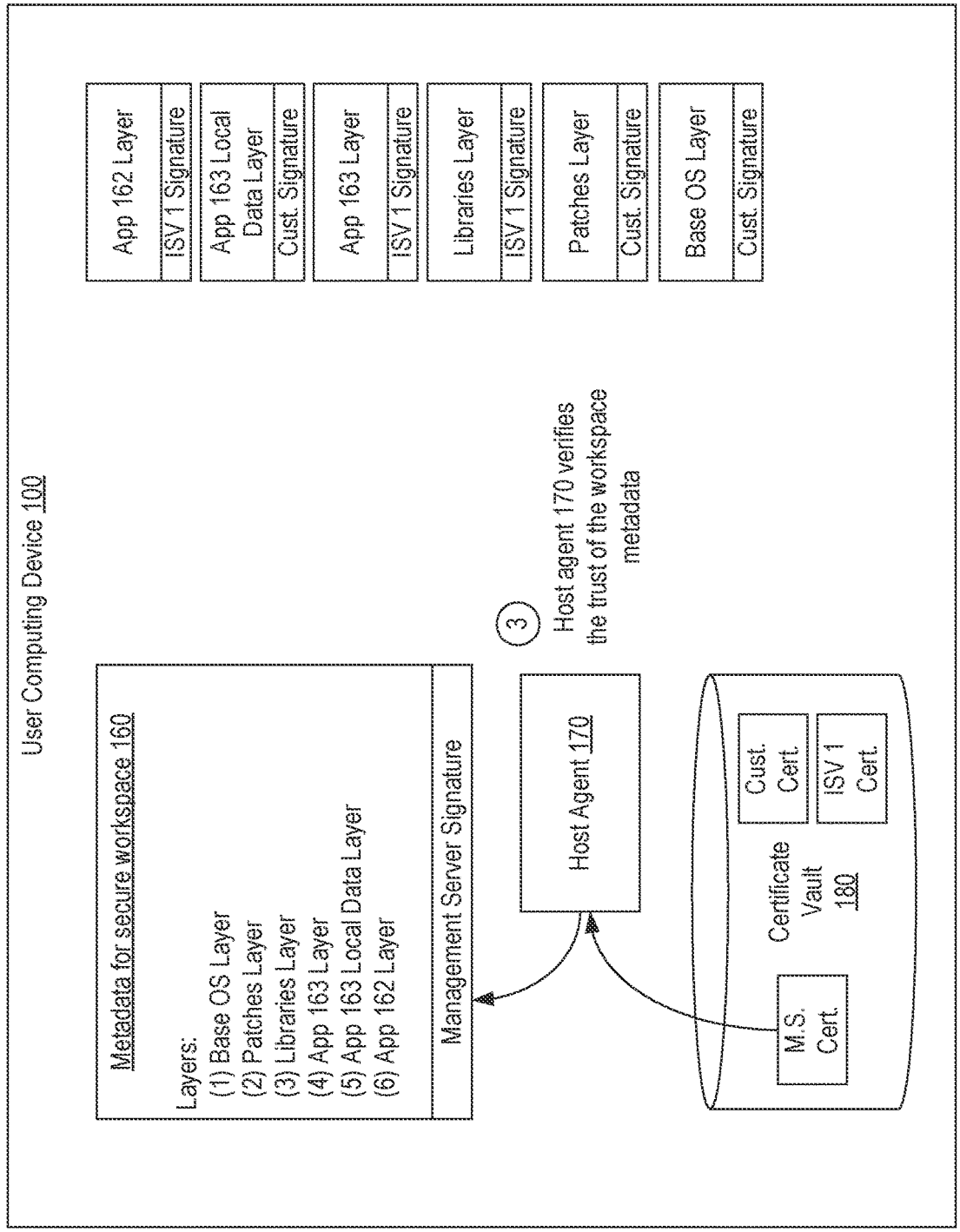

Turning to FIG. 4C, in step 3, which may be optional in some embodiments, host agent 170 can verify the trust of the workspace metadata. For example, host agent 170 could access management server 200's certificate stored in certificate vault 180 to verify a signature on the metadata for secure workspace 160. In this way, host agent 170 can verify that the operator of management server 200 is the source of the metadata and that the metadata has not been altered. If host agent 170 successfully verifies the trust of the workspace metadata, host agent 170 can then proceed with verifying the trust of each layer in the secure workspace as defined in the metadata. For example, FIG. 4C shows that the metadata for secure workspace 160 identifies which layers form secure workspace 160 and the order in which these layers should be applied when deploying secure workspace 160.

Figure 4D:
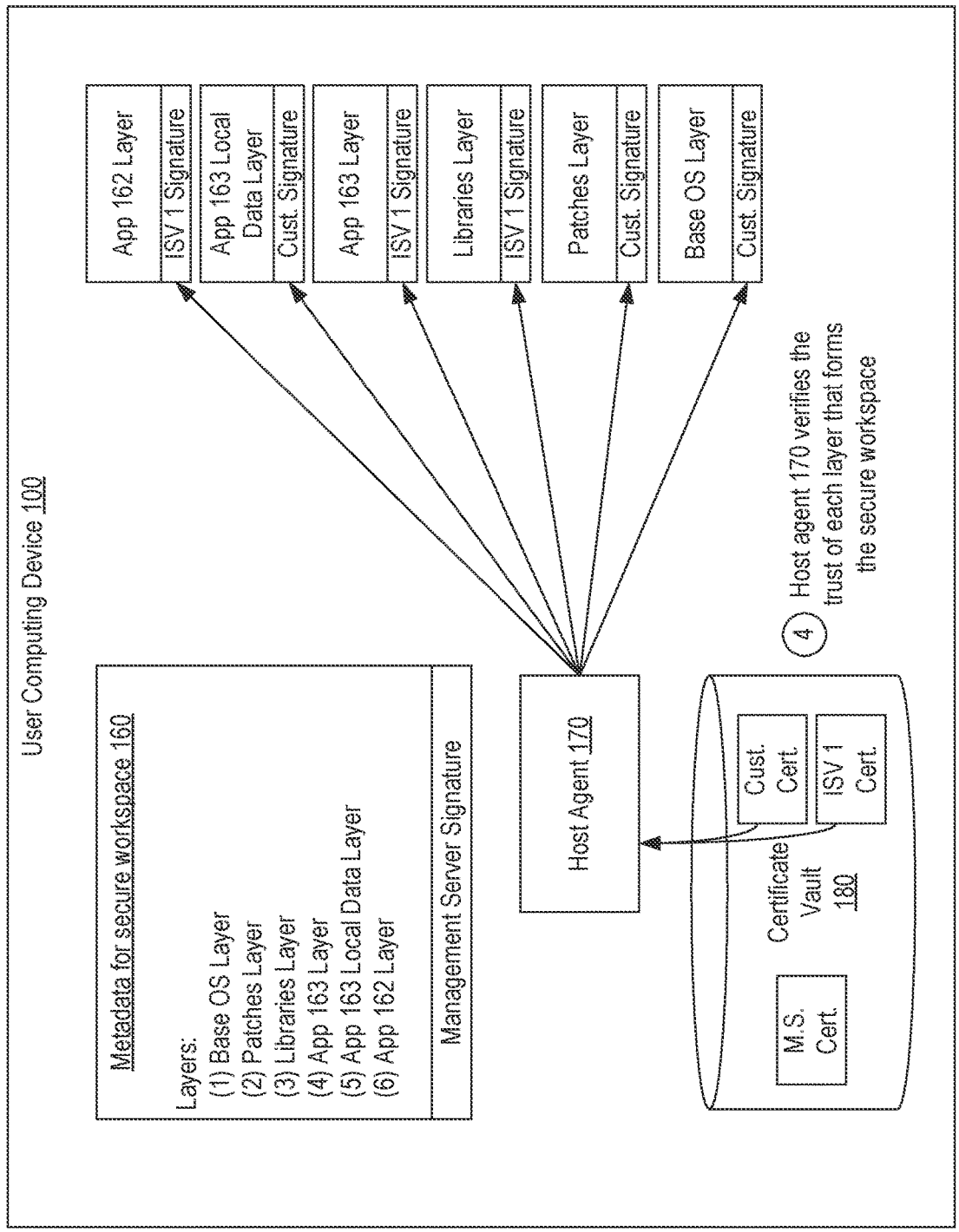

Turning to FIG. 4D, in step 4, host agent 170 can verify the trust of each layer that forms the secure workspace. For example, based on the metadata for secure workspace 160, host agent 170 could identify the base OS layer, the patches layer, the libraries layer, the app 163 layer, the app 163 local data layer, and the app 162 layer as forming secure workspace 160. Host agent 170 could then access certificate vault 180 to use the customer's certificate and ISV 1's certificate to verify the signatures on the respective layers. If secure vault 180 does not include these certificates at this point, host agent 170 could request them as represented in FIG. 4A. In this way, host agent 170 can verify that each layer originated from the respective owner and that the content of each layer has not been altered.

Figure 4E:
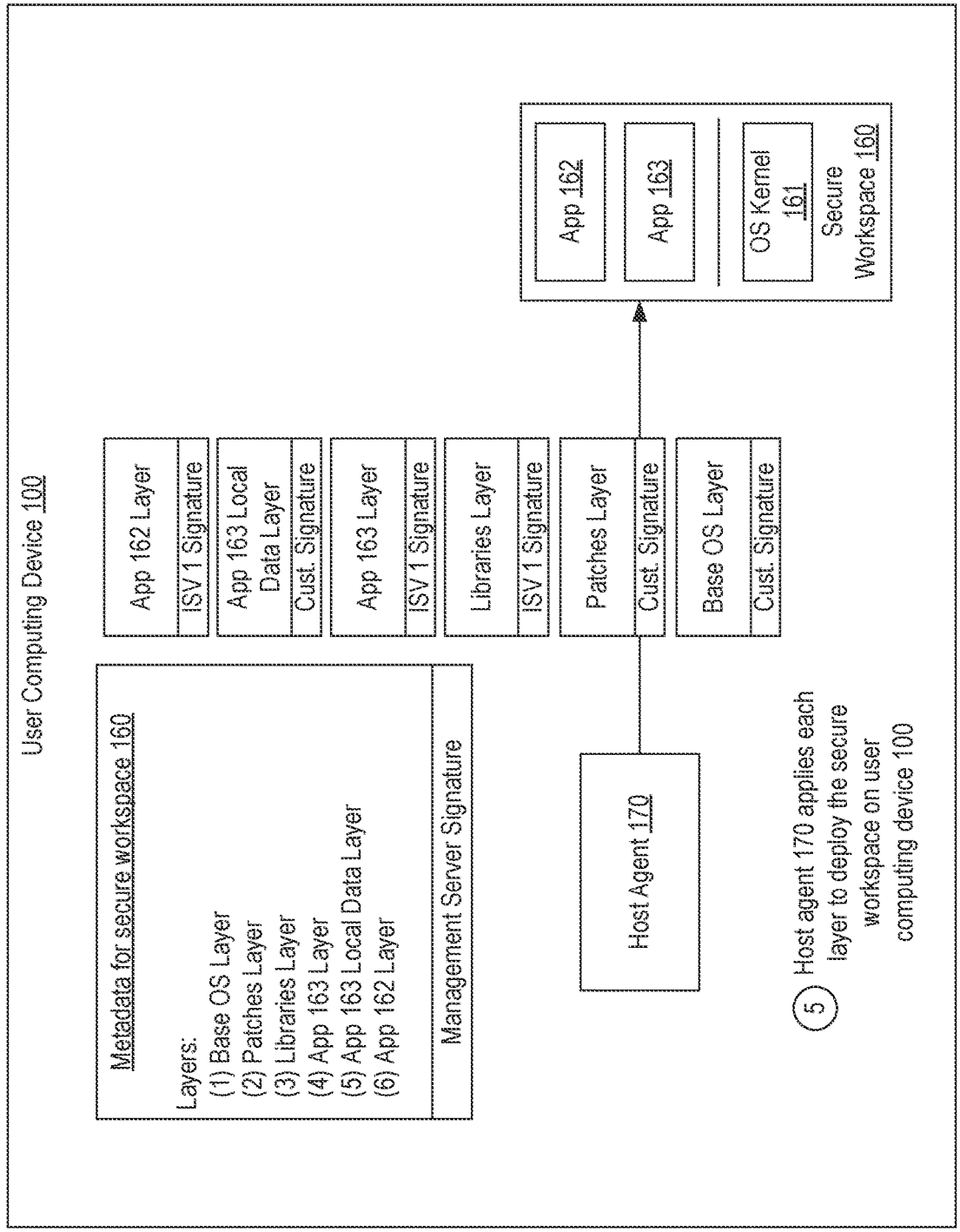

Turning to FIG. 4E, in step 5, and assuming host agent 170 successfully verified the trust of each layer that forms the secure workspace, host agent 170 can apply each layer to deploy the secure workspace on user computing device 100. For example, FIG. 4E represents that host agent 170 has created secure workspace 160 using the base OS layer, the patches layer, the libraries layer, the app 163 layer, the app 163 local data layer, and the app 162 layer. In contrast, if host agent 170 is unable to verify any of the layers that form the secure workspace, host agent 170 may forego deploying the secure workspace. Accordingly, a secure workspace is deployed only when the trust of each of the secure workspace's layers, which have distributed ownership, are individually verified.

In some embodiments, management service 201 could allow an administrator to specify restrictions on the layers that can form part of a secure workspace. For example, an administrator could specify that the base OS layer of any secure workspace must be owned by a particular owner. In such cases, if a base OS layer of a secure workspace is owned by another owner, which may be defined in the workspace metadata or determined during the trust verification process, host agent 170 could prevent the secure workspace from being deployed even if the trust of each layer is otherwise verified.

In some embodiments, host agent 170 may be configured to allow a secure workspace to still be deployed when the verification of the trust of one or more layers fails but may report such failure. For example, if the verification of the trust of the app 162 layer fails, host agent 170 could still deploy secure workspace 160 on user computing device 100 but may send an error report to management service 201. Management service 201 may then take some preventative action such as by notifying the customer's administrator, notifying the purported owner of the layer, attempting to replace the layer, etc.

In some embodiments, at least some of the certificates used in the above-described process could be retained in the respective owner's certificate store rather than in certificate vault 202. In such cases, host agent 170 could be configured to access these certificate stores to verify the trust of the layers.

In summary, embodiments of the present invention allow host agent 170 to verify the trust of a secure workspace that is formed of multiple layers with distributed ownership before deploying the secure workspace. This trust verification can be performed to enhance security as well as to ensure proper operation of the secure workspace.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed by a host agent on a user computing device, for verifying trust of a secure workspace that is formed of multiple layers with distributed ownership, the method comprising:
    accessing workspace metadata for a first secure workspace that is to be deployed on the user computing device, the workspace metadata for the first secure workspace identifying multiple layers that form the first secure workspace, wherein a first set of the multiple layers is owned and managed by a first owner and a second set of the multiple layers is owned and managed by a second owner, the first and second owners being different entities;
    using a first certificate pertaining to the first owner to verify trust of the first set of the multiple layers;
    using a second certificate pertaining to the second owner to verify trust of the second set of the multiple layers; and
    after verifying the trust of the first set of the multiple layers and the trust of the second set of the multiple layers, deploying the first set of multiple layers and the second set of multiple layers as part of the first secure workspace on the user computing device.

2. The method of claim 1, wherein accessing the workspace metadata for the first secure workspace comprises receiving the workspace metadata for the first secure workspace from a management service.

3. The method of claim 1, wherein the first set of multiple layers includes one or more of the multiple layers and the second set of multiple layers includes one or more of the multiple layers.

4. The method of claim 1, wherein the first owner is a customer, and the second owner is an independent software vendor.

5. The method of claim 4, wherein the first set of multiple layers and the second set of multiple layers comprise less than all of the multiple layers, the method further comprising:
    using a third certificate pertaining to a third owner to verify trust of a third set of the multiple layers that is different from the first set and the second set.

6. The method of claim 5, wherein the third owner is another independent software vendor.

7. The method of claim 1, wherein using the first certificate pertaining to the first owner to verify trust of the first set of the multiple layers and using the second certificate pertaining to the second owner to verify trust of the second set of the multiple layers comprises verifying a signature on each respective layer.

8. The method of claim 1, further comprising:
    using a third certificate to verify trust of the workspace metadata for the first secure workspace.

9. The method of claim 8, wherein the third certificate pertains to an operator of a management service that provides the multiple layers that form the first secure workspace.

10. The method of claim 1, wherein the workspace metadata for the first secure workspace defines an order of the multiple layers that form the first secure workspace.

11. The method of claim 1, wherein the first set of the multiple layers and the second set of the multiple layers comprise all of the multiple layers such that the first secure workspace is deployed on the user computing device only after verifying the trust of all the multiple layers that form the first secure workspace.

12. The method of claim 1, further comprising:
    verifying that a first layer of the multiple layers pertains to a particular owner.

13. The method of claim 1, further comprising:
    failing to verify a trust of a first layer of the multiple layers; and
    generating a notification of the failure to verify.

14. The method of claim 1, further comprising:
    accessing workspace metadata for a second secure workspace that is to be deployed on the user computing device, the workspace metadata for the second secure workspace identifying multiple layers that form the second secure workspace;
    failing to verify a trust of a particular layer of the multiple layers that form the second secure workspace; and in response to failing to verify the trust of the particular layer of the multiple layers that form the second secure workspace, foregoing deployment of the second secure workspace.

15. One or more computer storage media storing computer executable instructions which when executed on a user computing device implement a host agent that is configured to perform a method for verifying trust of a secure workspace that is formed of multiple layers with distributed ownership, the method comprising:
accessing workspace metadata for a first secure workspace that is to be deployed on the user computing device, the workspace metadata for the first secure workspace identifying multiple layers that form the first secure workspace, wherein a first set of the multiple layers is owned and managed by a first owner and a second set of the multiple layers is owned and managed by a second owner, the first and second owners being different entities;
using a first certificate pertaining to the first owner to verify trust of the first set of the multiple layers;
using a second certificate pertaining to the second owner to verify trust of the second set of the multiple layers; and
after verifying the trust of the first set of the multiple layers and the trust of the second set of the multiple layers, deploying the first set of multiple layers and the second set of multiple layers as part of the first secure workspace on the user computing device.

16. The computer storage media of claim 15, wherein the method further comprises:
verifying a trust of the workspace metadata.

17. The computer storage media of claim 15, wherein the method further comprises:
accessing workspace metadata for a second secure workspace that is to be deployed on the user computing device, the workspace metadata for the second secure workspace identifying multiple layers that form the second secure workspace, the multiple layers that form the second secure workspace having distributed ownership;
for each of the multiple layers that form the second secure workspace, attempting to verify a trust of the layer using a certificate of an owner of the layer;
failing to verify the trust of at least one of the multiple layers that form the second secure workspace; and
preventing the second secure workspace from being deployed on the user computing device.

18. The computer storage media of claim 15, wherein the first owner is a customer, and the second owner is an independent software vendor.

19. A system comprising:
a management server on which a management service is hosted; and
a plurality of user computing devices that are managed from the management server, each of the plurality of user computing devices having a host agent that is configured to perform a method for verifying trust of a secure workspace that is formed of multiple layers with distributed ownership, the method comprising:
accessing workspace metadata for a first secure workspace that is to be deployed on the respective user computing device, the workspace metadata for the first secure workspace identifying multiple layers that form the first secure workspace, wherein a first set of the multiple layers is owned and managed by a first owner and a second set of the multiple layers is owned and managed by a second owner, the first and second owners being different entities;
using a first certificate pertaining to the first owner to verify trust of the first set of the multiple layers;
using a second certificate pertaining to the second owner to verify trust of the second set of the multiple layers; and
after verifying the trust of the first set of the multiple layers and the trust of the second set of the multiple layers, deploying the first set of multiple layers and the second set of multiple layers as part of the first secure workspace on the respective user computing device.

20. The system of claim 19, wherein accessing the workspace metadata for the first secure workspace comprises receiving the workspace metadata for the first secure workspace from the management server.

* * * * *